(12) United States Patent
Buescher

(10) Patent No.: US 10,043,124 B2
(45) Date of Patent: Aug. 7, 2018

(54) VOLTAGE REGULATION CIRCUIT FOR AN RFID CIRCUIT

(71) Applicant: EM Microelectronic-Marin S.A., Marin (CH)

(72) Inventor: Kevin Scott Buescher, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 15/380,663

(22) Filed: Dec. 15, 2016

(65) Prior Publication Data

US 2018/0174010 A1    Jun. 21, 2018

(51) Int. Cl.
  *G06K 19/06*    (2006.01)
  *G06K 19/07*    (2006.01)
(52) U.S. Cl.
  CPC .............................. *G06K 19/0723* (2013.01)
(58) Field of Classification Search
  CPC .......... G06K 19/06; G06K 19/00; G06K 7/08; G06K 5/00; G06F 17/00
  USPC ......................... 235/492, 375, 487, 451, 380
  See application file for complete search history.

(56) References Cited

U.S. PATENT DOCUMENTS

| | | | |
|---|---|---|---|
| 7,538,673 B2 | 5/2009 | Balachandran et al. | |
| 2007/0046369 A1* | 3/2007 | Schober | G06K 19/0707 330/7 |
| 2008/0094180 A1* | 4/2008 | Kato | G06K 19/0701 340/10.3 |
| 2010/0039265 A1* | 2/2010 | Spivey, Jr. | G06K 19/0723 340/572.3 |
| 2014/0159831 A1* | 6/2014 | van Wanum | H03K 17/693 333/103 |
| 2015/0154486 A1* | 6/2015 | McFarthing | G06K 19/0712 235/492 |
| 2017/0048937 A1* | 2/2017 | Wang | H01F 38/14 |

* cited by examiner

*Primary Examiner* — Edwyn Labaze
(74) *Attorney, Agent, or Firm* — Oblon, McClelland, Maier & Neustadt, L.L.P.

(57) ABSTRACT

The present invention relates in one aspect to a voltage regulation circuit for an RFID circuit (10), the voltage regulation circuit comprising:
  an input (20) connectable to a rectifier circuit (14),
  an output (22) connectable to a processor (18) of the RFID circuit,
  at least one switch (24) arranged between the input (20) and the output (22) and connected to the input (20) and the output (22), wherein the switch (24) is capable to electrically connect the output (22) to the input (20) and to disconnect the output (22) from the input (20).

14 Claims, 3 Drawing Sheets

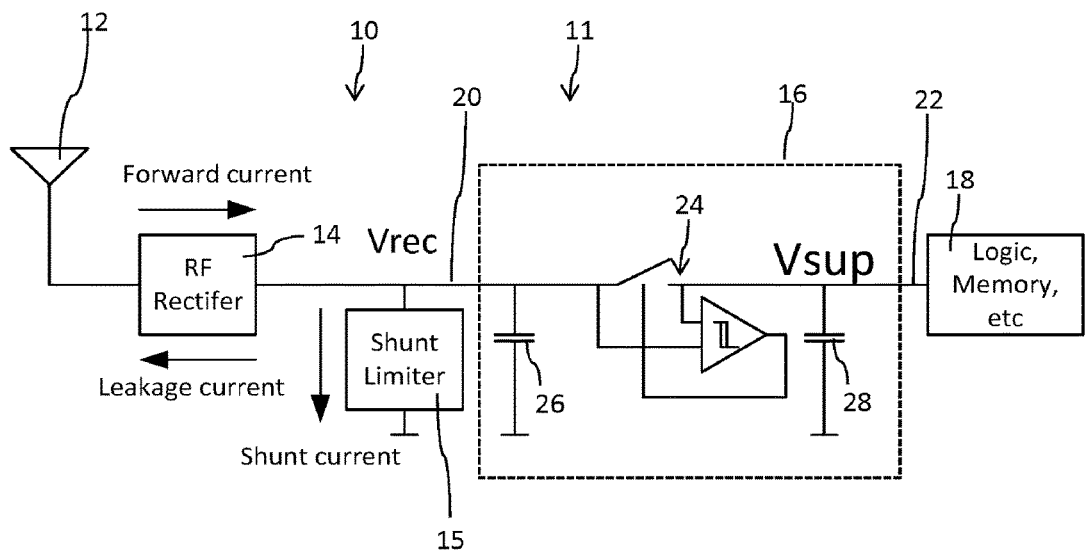
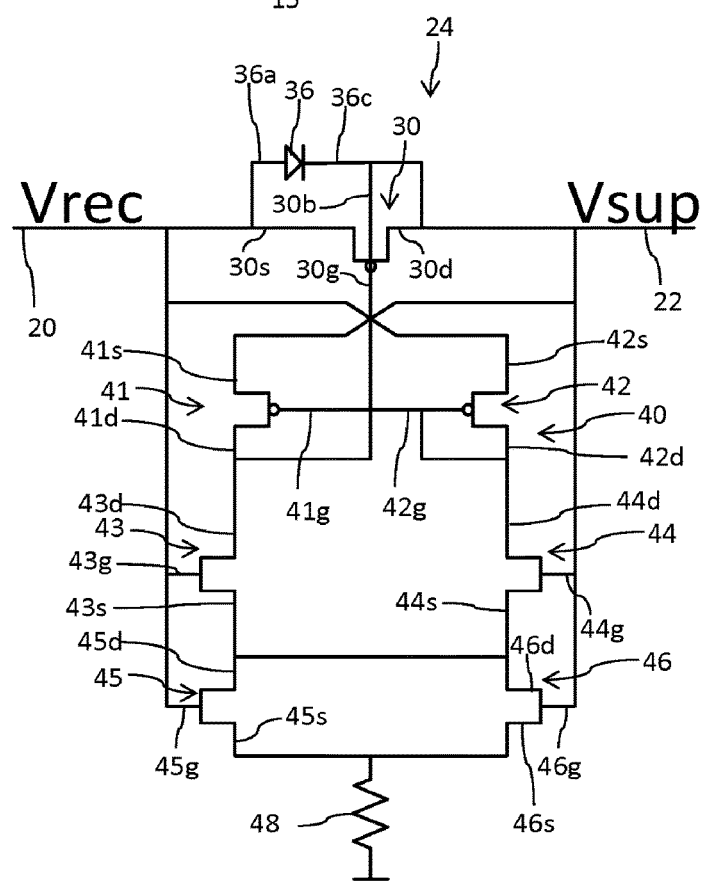
Fig. 1
Fig. 2

VOLTAGE REGULATION CIRCUIT FOR AN RFID CIRCUIT

TECHNICAL FIELD

The present invention relates to the field of RFID circuits, in particular to the field of RFID transponders such as passive or active RFID transponders. In one aspect the invention relates to a voltage regulation circuit of an RFID circuit, wherein the voltage regulation circuit is configured to limit and/or to regulate a driving voltage for a logic unit or processor of the RFID transponder. Moreover, the voltage regulation circuit is configured to derive a driving voltage for a logic unit or processor that is derived from an external RF field.

BACKGROUND OF THE INVENTION

With RFID transponders, such as RFID tags a rectifier is used to extract electrical energy out of an incoming RF signal. The rectifier is used to convert the RF energy into a DC voltage that is configured to power a digital unit or logic unit or to power a processor of the RFID circuit. Common architectures for rectifiers use a Dickson-style charge pump and cascade multiple stages together. Each stage of such a charge pump can be comprised of two diodes in combination with two capacitors.

In current designs, it is usual to implement MOSFET transistors to improve efficiency and to enable integration of the rectifier with CMOS architecture. To accommodate a large dynamic range of RF input energy it is typical to follow the rectifier with a limiter that is configured to limit the output voltage to a level that prevents damage to the processor or logic unit of the RFID circuit when a high power RF signal is present at an antenna of the RFID circuit. However, such a limiter can be rather inefficient. It may waste power and/or it may induce a large amount of fluctuations or ripples on an output electrically connected to the logic unit or processor.

One deficiency of a limiter-based voltage regulation for an RFID circuit is that during an amplitude modulation (AM modulation) the incoming RF signal is switched on and off to encode data for the RFID circuit. In such situations the limiter may waste energy by shunting extra energy to ground during the transitions from the RF on state to the RF off state and vice versa.

Additionally, the rectifier may exhibit a reverse current leakage that may also siphon energy away from the recovered DC voltage during the time period when no RF incoming signal is present. Also due to the switching action of the RF input signal and the limited bandwidth of the limiting circuitry comparatively large fluctuations or ripples may be induced onto the DC output signal. Such fluctuations or ripples may cause problems with sensitive analogue circuitry of the RFID circuit or RFID tag. Such fluctuations or ripples on the DC output of the regulator or limiter become even worse when the incoming RF field is comparatively strong. This is because the limiter must transition very fast from shunting a lot of excess current to ground during the time when the RF field is present to not shunting any current while the RF signal is switched off.

Document U.S. Pat. No. 7,538,673 B2 describes a voltage regulation circuit based on low drop oscillators (LDO). Such a solution is limited in bandwidth and with regard to so called headroom losses. The implementation of numerous LDOs involves four active circuits that may add complexity, die array and increased current consumption.

It is therefore desirable to provide an improved voltage regulation circuit for an RFID circuit that exhibits a reduced degree of complexity and which comprises only a limited number of active components. It is further desirable to provide a faster reaction time and a wider bandwidth. Also, less die array should be used by the voltage regulation circuit. The voltage regulation circuit should also exhibit minimal headroom losses and lower current consumption.

SUMMARY OF THE INVENTION

In one aspect, there is provided a voltage regulation circuit for an RFID circuit. The voltage regulation circuit comprises an input connectable to a rectifier circuit of the RFID circuit and an output connectable to a processor of the RFID circuit. The voltage regulation circuit further comprises at least one switch arranged between the input and the output. The switch is connected to the input and to the output. The switch is further capable to electrically connect the output to the input and to disconnect the output from the input.

In particular, at least one switch, such as an active switch, is configured to disconnect the output from the input. In this way excess transient current shunted to ground by the voltage regulation circuit can be reduced. Moreover, a reverse leakage current through the rectifier circuit can be reduced and the magnitude of fluctuations or ripples on the output signal of the voltage regulation circuit can be limited.

The active switch functions as a 'diode-like' circuit that further isolates the logic unit or the digital processor of the RFID circuit from the rectifier circuit and from an optional limiter. The voltage regulation circuit exhibits a comparatively low insertion loss to not impact the operation of the logic unit or processor near the lower sensitivity of the device. In this way headroom losses can be effectively reduced. The active switch and the switch structure provided by the active switch creates a low insertion loss when turned on and a high resistance when turned off.

In one embodiment, the voltage regulation circuit comprises an input capacitor connected to the input. One electrode of the input capacitor is connected to the input of the voltage regulation circuit and the other electrode of the input capacitor is connected to ground.

In a further embodiment, the voltage regulation circuit also comprises an output capacitor connected to the output. Typically, one electrode of the output capacitor is connected to the output and the other electrode of the output capacitor is connected to ground. In this way and with an input capacitor and an output capacitor a conventional buffer capacitor typically used to store and to filter a DC voltage generated by the rectifier circuit is now split into two separate capacitors.

The input capacitor is located and arranged on that side of the active switch that is connected to the rectifier circuit and the output capacitor is located on the output side of the active switch. It is hence connected to the output of the voltage regulation circuit. With the active switch and the two capacitors a rather simple voltage regulation circuit can be provided exhibiting a rather high bandwidth and a short reaction time.

The bandwidth of the voltage regulation circuit can be much higher than with conventional voltage regulation circuits implemented with an LDO for instance.

A wider bandwidth is beneficial in improving sensitivity and/or reducing fluctuations or ripples on the output or the DC supply for the processor. With a narrow bandwidth circuit, e.g. implementing a conventional LDO architecture, the reaction time can become comparatively large and may be in the order of microseconds. This may create a situation where a shunt limiter wastes power during modulation of an incoming RF signal. The shunt limiter may not disable quick enough when the RF field goes away. Compared to these deficiencies the presently claimed and described voltage regulation circuit with its switch or switching network may exhibit a much faster reaction time and may therefore prevent respective power losses.

In another embodiment, a capacitance of the output capacitor is at least 10 times, at least 100 times or at least 1000 times larger than the capacitance of the input capacitor. When keeping the output capacitor much larger than the input capacitor a maximum power saving can be achieved.

In another embodiment, the switch of the voltage regulation circuit comprises a MOSFET transistor configured as a switch.

A drain of the switch MOSFET transistor is connected to the output and a source of the switch MOSFET transistor is connected to the input of the voltage regulation circuit. The switch MOSFET transistor can be interpreted as a main or switching transistor of the voltage regulation circuit. The switch MOSFET transistor might be implemented as a PMOS device. However, it may be also implemented as an NMOS device. The switch MOSFET transistor may be quickly switched on or off in order to electrically connect or to electrically disconnect the output and the input of the voltage regulation circuit.

In a further embodiment, the voltage regulation circuit further comprises a diode connected to the source and to the drain of the switch MOSFET transistor. The diode may comprise a Schottky-diode. The diode may be also connected between the source and a bulk of the switch MOSFET transistor. In this way, the bulk of the MOSFET transistor, e.g. implemented as a PMOS device may be always at a highest voltage that is present on the source or drain of the switch MOSFET transistor.

By means of the diode, the bulk of the switch MOSFET transistor is kept within a predefined range of the highest potential. This might be sufficient to prevent any reverse forward biasing of the bulk diode. This might be of particular benefit since with the present voltage regulation circuit the source of the switch MOSFET transistor may at times be at a higher potential than the drain of the switch MOSFET transistor and vice versa. By means of the diode between the source, the drain and the bulk of the switch MOSFET transistor the bulk thereof is kept for instance within 150 mV of the highest potential applicable to the switch MOSFET transistor. This may be sufficient to prevent any reverse forward biasing of the bulk diode.

According to another embodiment, an anode of the diode is connected to the source of the switch MOSFET transistor. A cathode of the diode is connected to the drain of the switch MOSFET transistor and to a bulk of the switch MOSFET transistor. In this way, the bulk of the MOSFET transistor can be kept within a predefined range of the highest potential available at the source or drain of the switch MOSFET transistor. In one embodiment the switch MOSFET transistor is implemented as a PMOS transistor. In other embodiments the switch MOSFET transistor may be implemented as an NMOS device, mutatis mutandis.

In one embodiment, the voltage regulation circuit also comprises a current mirror having a first mirror MOSFET transistor and a second mirror MOSFET transistor. Here, a gate of the first mirror MOSFET transistor is connected to a gate of the second mirror MOSFET transistor. Typically, the first and second mirror MOSFET transistors are both implemented as PMOS devices or as NMOS devices. If the switch MOSFET transistor is implemented as a PMOS device also the first and the second MOSFET transistors will be implemented as PMOS devices. In another embodiment and if the switch MOSFET transistor should be implemented as an NMOS device also the first and the second mirror MOSFET transistors may be implemented as NMOS devices.

There may be further provided a self-biased comparator that may comprise first and second biasing MOSFET transistors and optionally at least or more resistors to provide a low bias current for the comparator to operate on. By means of a self-biased comparator it may be provided that the voltage regulation circuit starts up correctly when no input voltage should be present. Typically, the self-biased comparator is combined or integrated with the current mirror. It may be the first and second mirror MOSFET transistors of the current mirror that help to improve the switching speed of the active switch and hence of the entire voltage regulation circuit.

The first and the second biasing MOSFET transistors may form a differential pair that determines whether a voltage at the input or a voltage at the output is greater. The first and the second biasing MOSFET transistors steer the current to turn on or turn off the switch MOSFET transistor. Turning on and off the switch MOSFET transistor may be conducted along with the current mirror and the mirror MOSFET transistors thereof. The first and the second biasing MOSFET transistors can be thought of as pseudo bias transistors as they may operate in triode mode and form a resistance that is in series with another resistor to set a bias current.

In one embodiment, a source of the first mirror MOSFET transistor is connected to the output of the voltage regulation circuit. Moreover, a source of the second mirror MOSFET transistor is connected to the input of the voltage regulation circuit.

In another embodiment, a drain of the first mirror MOSFET transistor is connected to the gate of the switch MOSFET transistor.

In still another embodiment, a drain of the second mirror MOSFET transistor is connected to the gate of the second mirror MOSFET transistor. In this way the first and second mirror MOSFET transistors are cross connected. This enables to improve and to enhance the switching speed of the voltage regulation circuit and of its switch.

In another embodiment, the voltage regulation circuit comprises a first biasing MOSFET transistor and a second biasing MOSFET transistor. Here, a gate of the first biasing MOSFET transistor is connected to the input and a gate of the second biasing MOSFET transistor is connected to the output. The first and second MOSFET transistors in combination with the first and second mirror MOSFET transistors provide a self-biased comparator that will automatically start up correctly as an RF input signal is received by an antenna of the RFID circuit. Typically, when the first and the second mirror MOSFET transistors are implemented as PMOS devices the first and second biasing MOSFET transistors are implemented as NMOS devices.

In a further embodiment, a drain of the first biasing MOSFET transistor is connected to the drain of the first mirror MOSFET transistor and a drain of the second biasing MOSFET transistor is connected to the drain of the second mirror MOSFET transistor. In other words, the first mirror MOSFET transistor and the first biasing MOSFET transistor are connected in series. In addition also the second mirror MOSFET transistor and the second biasing MOSFET transistor are connected in series. That terminal of the first and the second biasing MOSFET transistors that faces away from the respective mirror MOSFET transistors is connected to ground via a resistor and/or a long channel MOSFET transistor, respectively. In this way a rather low current is provided for the comparator to operate on. This implementation allows the current consumption to be low when the RF field is weak and increases as more RF energy is extracted from the field enabling the bandwidth to increase as the RF field increases in intensity.

Since the first mirror MOSFET transistor is connected to the output and the other, namely the second mirror MOSFET transistor is connected to the input the relative current ratios flowing in the first and second mirror MOSFET transistors is dependent on the ratio of an input voltage to the output voltage provided at the input and the output, respectively. As the input voltage may start to decrease in amplitude relative to the output voltage a current flowing in the first mirror MOSFET transistor will increase which will rapidly pull the gate of the switch MOSFET transistor high. As a consequence, the active switch will be turned off. With an opposite condition when the input voltage starts to rise above the output voltage the current through the first mirror MOSFET transistor will decrease thereby allowing the current through the first biasing MOSFET transistor to pull the gate of the switch MOSFET transistor low, thereby turning on the switch.

In effect, the self-biased comparator and the current mirror provided by the above mentioned configuration of first and second mirror MOSFET transistors, first and second biasing MOSFET transistors in combination with the switch MOSFET transistor provides a switching behavior of the active switch such that the switch is turned on when the voltage at the input is larger than the voltage at the output. Furthermore, the switch will be turned off when the voltage at the output is larger than the voltage at the input. In other words the switch of the voltage regulation circuit is configured to turn on and to turn off quickly at a desired time. The switch will be turned on when there is an RF signal present to the input so that the output capacitor can be charged. The switch will be quickly turned off when there is no RF signal present at the input in order to prevent a possible discharging of the output capacitor.

In another aspect, an RFID circuit is provided that comprises an antenna, a rectifier circuit connected to the antenna, a processor and a voltage regulation circuit as described above. An input of the voltage regulation circuit is connected to an output of the rectifier circuit. An output of the voltage regulation circuit is connected to an input of the processor. Optionally, the RFID circuit may further comprise a limiter, such as a shunt limiter. An input of the shunt limiter may be connected to both, the input of the voltage regulation circuit and to the output of the rectifier circuit. An output of the limiter is typically connected to ground. The limiter may be implemented as a so called shunt limiter.

In another aspect, there is further provided a portable electronic device comprising at least one RFID circuit as described above. The portable electronic device may comprise an RFID transponder, such as an RFID tag. Typically, the portable electronic device is implemented as a passive RFID transponder.

To summarize, the active switch of the voltage regulation circuit in combination with an input capacitor and an output capacitor enables improvements to the efficiency of an RFID circuit. In a first aspect current losses through the rectifier circuit during modulation can be reduced by isolating the output capacitor, hence the major storage capacitor from the rectifier circuit. Furthermore, comparatively large fluctuations and rather large ripples during modulation on the output of the voltage regulation circuit can be reduced by isolating the input from the storage capacitor. It is further beneficial and it provides improvements to testability of an RF front end of an RFID circuit or of an RFID device by allowing a separation of the rectifier circuit and those electronic components of the RFID circuit that consume current, such as the logic unit or the processor.

Any potential leakage of current by the rectifier circuit can be minimized by the active switch of the voltage regulation circuit. When the switch is turned off, e.g. during RF modulation and when an RF field is not present only the input capacitor is connected to the rectifier circuit. In effect, any reverse leakage current will only drain the voltage stored in the input capacitor and the voltage on the output capacitor may be preserved. It may be available to supply the logic unit or the processor with electric power. This effect is even enhanced if the capacitance of the output capacitor is much larger than the capacitance of the input capacitor. The same aspects also apply to the current shunted to ground through the switch, in particular through the second mirror MOSFET and the second biasing MOSFET transistor.

In situations where the external RF field is comparatively strong the shunt limiter may shunt hundreds of microamperes of current directly to ground in order to keep the voltage at the output at an acceptable value. In situations when the external RF field goes away during modulation, due to the finite bandwidth of the limiter there will be a period of time where even though there is no RF field to provide any current the limiter is still shunting current to ground. During this time period the limiter is actually discharging the output capacitor. With conventional voltage regulation circuits being void of a switch, as described above, this means that the supply voltage for the processor is reduced as the capacitor is discharged.

But with the active switch as currently proposed the main load capacitor or the output capacitor will be quickly isolated from the limiter and/or the rectifier circuit and cannot be discharged. This isolation greatly reduces any fluctuations or ripples on the output signal when comparatively high RF fields are present. The isolation further provides a more stable voltage supply to the logic unit or processor of the RFID circuit. Moreover, with the enablement of separating and decoupling the input and the output as well as by means of separating the input capacitor and the output capacitor improved testability of the voltage regulation circuit and of the entire RFID circuit can be provided.

In a test environment, the output voltage can be externally driven to a higher voltage than the input voltage. This will permanently isolate the RF front end from the rest of the RFID circuit, namely from the processor or logic unit thereof. This may further improve measurement accuracy for such parameters as rectifier efficiency, processor current consumption, limiter performance and power check thresholds.

It is further to be mentioned that the voltage regulation circuit only comprises a minimum of active components. It can be implemented in a rather cost efficient and space saving way.

BRIEF DESCRIPTION OF THE DRAWINGS

In the following, an embodiment of the voltage regulation circuit and of a corresponding RFID circuit is illustrated by making reference to the drawings, in which:

FIG. 1 shows a schematic block diagram of an RFID circuit,

FIG. 2 shows a schematic architecture of the active switch of the voltage regulation circuit.

DETAILED DESCRIPTION OF THE INVENTION

Figure 3:
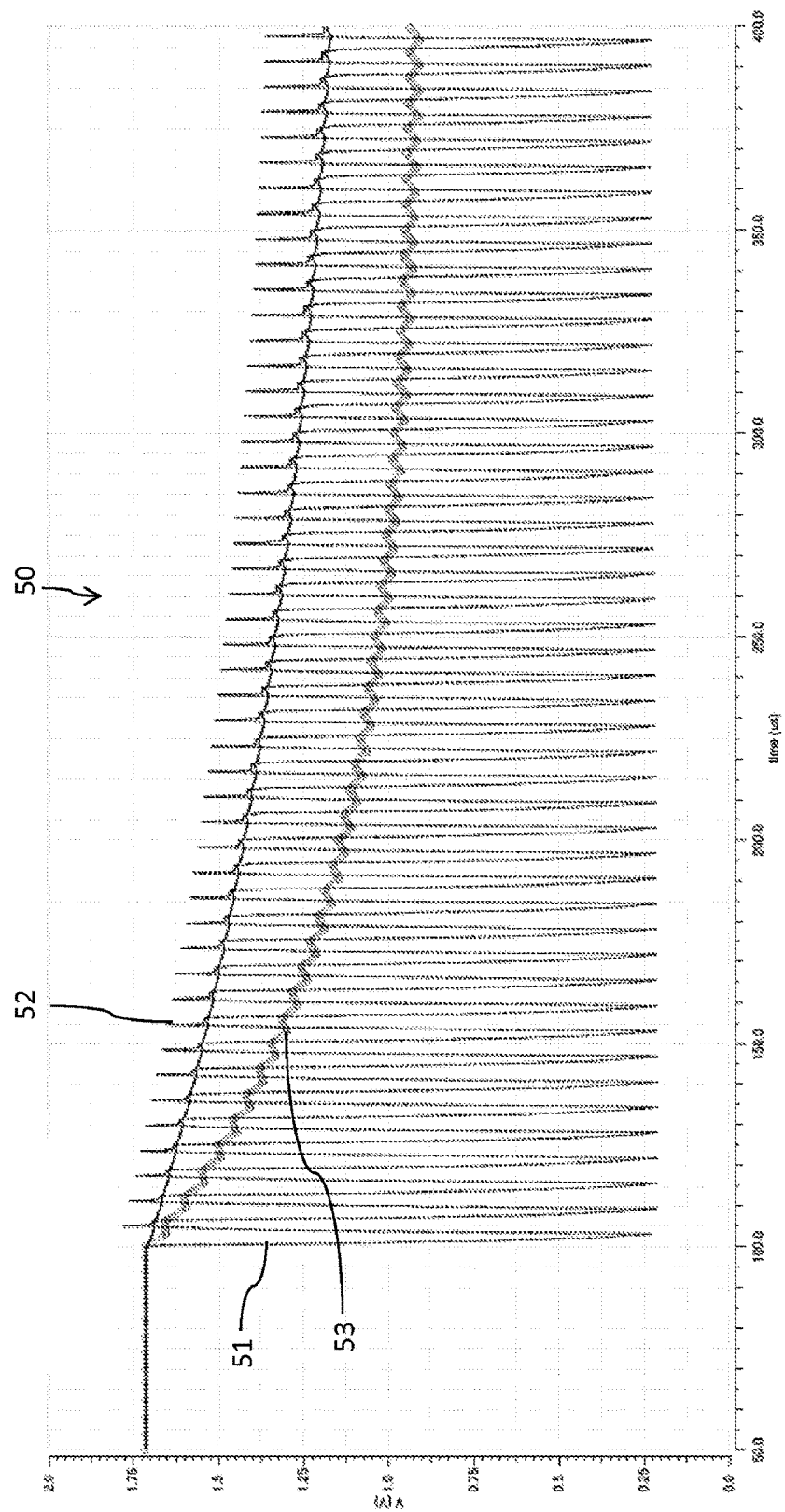
FIG. 3 shows a simulation of the performance of the voltage regulation circuit when driven with a comparatively low power RF field.

In FIG. 1, a schematic block diagram of an RFID circuit 10 is illustrated. The RFID circuit 10 comprises an antenna 12 and an RF front end 11. The RF front end 11 comprises a rectifier circuit 14, a limiter 15 and a voltage regulation circuit 16. The voltage regulation circuit 16 is only illustrated in dashed lines. The voltage regulation circuit 16 comprises an input 20 connected to the rectifier circuit 14. The voltage regulation circuit 16 comprises an output 22 connected to a digital unit, namely to a logic unit or processor 18 of the RFID circuit 10. The RFID circuit 10 comprises the RF-front end 11 and the logic unit 18, the latter of which typically comprising a processor and a memory. The voltage regulation circuit 16 is configured to provide a DC driving voltage to the logic unit or processor 18, which DC voltage is derived from an RF input voltage received by the antenna 12.

The voltage regulation circuit as shown in FIG. 1 comprises an input 20 connected to both, an output of the rectifier circuit 14 and to the limiter 15. The voltage regulation circuit 16 further comprises an output 22 connected to the processor 18 of the RFID circuit 10. The voltage regulation circuit further comprises a switch 24 arranged between the input 20 and the output 22. The switch 24 is connected to the input 20 and to the output 22. The switch 24 is capable to electrically connect the output 22 to the input 20 and to disconnect the output 22 from the input 20.

As shown in FIG. 1, the voltage regulation circuit 16 also comprises an input capacitor 26 that is connected to the input 20. The voltage regulation circuit 16 also comprises an output capacitor 28 connected to the output 22. As shown in FIG. 1 only one electrode of the input capacitor 26 and the output capacitor 28 is connected to the input 20 and to the output 22, respectively. Another electrode of the input capacitor 26 and the output capacitor 28 is connected to ground. Typically, the output capacitor 28 serves as a main buffer capacitor. Its capacitance is at least 10 times, at least 100 times or at least 1000 times larger than the capacitance of the input capacitor 26.

By means of the switch 24 the output capacitor 28 can be isolated and separated from the input capacitor 26, especially in situations where no RF field is present and in situations where a voltage at the input 20 should decrease or should be even lower than the voltage at the output 22. In other situations where the voltage at the input Vrec is larger than the output voltage Vsup the switch 24 is turned on so as to provide a driving power to the processor 18.

In FIG. 2, a simplified circuit schematic of the switch 24 of FIG. 1 is provided. As illustrated there, the switch 24 is implemented by numerous MOSFET transistors 30, 41, 42, 43, 44, 45 and 46. In the presently illustrated implementation MOSFET transistors 30, 41 and 42 are implemented as PMOS devices whereas MOSFET transistors 43, 44, 45 and 46 are implemented as NMOS devices.

The switch 24 as illustrated in FIG. 2 comprises a switch MOSFET transistor 30 having a source $30s$ connected to the input 20 and further having a drain $30d$ connected to the output 22. The switch MOSFET transistor 30 behaves as a main switching transistor. Operation of the switch MOSFET transistor 30 between an off state and an on state separates and connects the input 20 and the output 22, respectively.

The switch MOSFET transistor 30 comprises a bulk $30b$ that must be correctly biased at all times. With a PMOS device the bulk $30b$ should be at or near the highest available voltage that is present on the source $30s$ or drain $30d$. In the present embodiment the source $30s$ may be at some instances at a higher potential than the drain $30s$ of the switch MOSFET transistor and vice versa. In order to avoid any reverse forward biasing there is provided a diode 36 that may be implemented as a Schottky-diode. An anode $36a$ of the diode 36 is connected to the source $30s$ and a cathode $36c$ is connected to both the drain $30d$ and the bulk $30b$. The diode 36 will keep the bulk $30b$ of the switch MOSFET transistor 30 at a predefined level so as to avoid any reverse biasing of the switch MOSFET transistor 30.

The switch 24 further comprises a current mirror 40 having a first mirror MOSFET transistor 41 and a second mirror MOSFET transistor 42. As illustrated the gates $41g$ and $42g$ of the first mirror MOSFET transistor 41 and the second mirror MOSFET transistor 42 are mutually connected. A source $41s$ of the first mirror MOSFET transistor 41 is connected to the output 22. A source $42s$ of the second mirror MOSFET transistor 42 is connected to the input 20. A drain $41d$ of the first mirror MOSFET transistor 41 is connected to the gate $30g$ of the switch MOSFET transistor 30. A drain $42d$ of the second mirror MOSFET transistor 42 is connected to the gate $41g$, $42g$ of the first and the second mirror MOSFET transistors 41, 42, respectively.

There are further provided a first biasing MOSFET transistor 43 and a second biasing MOSFET transistor 44. While the switch MOSFET transistor 30 and the two mirror MOSFET transistors 41, 42 are implemented as PMOS devices the biasing MOSFET transistors 43, 44 are implemented as NMOS devices. A drain $43d$ of the first biasing MOSFET transistor 43 is connected to the drain $41d$ of the first mirror MOSFET transistor 41. A source $43s$ of the first biasing MOSFET transistor 43 is connected to ground via a resistor 48 and via an additional long channel MOSFET transistor 45.

Correspondingly, also the drain $44d$ of the second biasing MOSFET transistor 44 is connected to the drain $42d$ of the second mirror MOSFET transistor 42. A source $44s$ of the second biasing MOSFET transistor 44 is connected to ground via the resistor 48 and via an additional long channel MOSFET transistor 46. The long channel MOSFET transistors 45, 46 may be implemented as NMOS devices. They may be implemented as 3.3 V NMOS devices or the like. By means of long channel MOSFET transistors 45, 46 and a resistor 48 in series with the two parallel connected long channel MOSFET transistors 45, 46 there is provided a comparatively low current for the comparator to operate on. The comparator is typically implemented by the interaction and connection of the first and second mirror MOSFET transistors 41, 42 and the first and second biasing MOSFET transistors 43, 44.

Furthermore and as illustrated in FIG. 2, a gate $43g$ of the first biasing MOSFET transistor 43 is connected to the input 20. A gate $44g$ of the second biasing MOSFET transistor 44 is connected to the output 22. Likewise also a gate $45g$ of the first long channel MOSFET transistor 45 is connected to the input 20. A gate $46g$ of the second long channel MOSFET transistor 46 is connected to the output 22. The drain 45d of the first long channel MOSFET transistor 45 is connected to the source 43s of the first biasing MOSFET transistor 43.

A source 45s of the first long channel MOSFET transistor 45 is connected to the resistor 48 and hence to ground. In a similar way also the drain 46d of the second long channel MOSFET transistor 46 is connected to the source 44s of the second biasing MOSFET transistor 44. A source 46s of the second long channel MOSFET transistor 46 is connected to the resistor 48. In addition and as illustrated in FIG. 2 the drain 45d and the drain 46d of the first and the second long channel MOSFET transistors 45, 46 are interconnected. Consequently, also the sources 43s, 44s of the first and second biasing MOSFET transistors 43, 44 are interconnected.

The current mirror 40 and the first and second biasing MOSFET transistors 43, 44 provide a self-biased comparator that will automatically start up correctly if the antenna 12 is exposed to an RF signal.

The self-biasing in combination with a low current consumption are guaranteed by making use of the first and second long channel MOSFET transistors 45, 46 and by implementing the resistor 48. A switching velocity or switching speed of the switch MOSFET transistor 30 is comparatively high and enlarged compared to LDO-based implementations of a voltage regulation circuit. This is achieved by the cross connection of the first and second mirror MOSFET transistors 41, 42. Since the first mirror MOSFET transistor 41 is connected to the output 22 and since the second mirror MOSFET transistor 42 is connected to the input 20 a relative current ratio flowing in these MOSFET transistors 41, 42 is dependent on the ratio of Vrec to Vsup at the input 20 and at the output 22.

As Vrec starts to decrease in amplitude relative to Vsup the current flowing in the first mirror MOSFET transistor 41 is increased which will rapidly pull the gate 30g of the switch MOSFET transistor 30 and turn off the switch MOSFET transistor. In this case the output 22 is decoupled and disconnected from the input 20. In the opposite case, when Vrec starts to rise above Vsup the current through the first mirror MOSFET transistor 41 will decrease rapidly allowing the current through the first biasing MOSFET transistor 43 to pull the gate 30g of the switch MOSFET transistor 30 low and to turn on the switch MOSFET transistor 30.

With the presently proposed voltage regulation circuit 16 current losses through the rectification circuit 14 during modulation can be reduced by isolating the output capacitor 28 from the rectifier circuit 14. High field ripples or fluctuations on the output 22 during modulation can be effectively reduced by isolating the limiter 15 from the output capacitor 28. Additionally, testability of the RF front end 11 of the RFID circuit 10 can be improved by means of separating the rectifier 14 and the current consuming components, such as the processor 18.

Any potential leakage of current by the rectifier 14 is minimized by the switch 24. When the switch 24 is turned off, e.g. during RF modulation when the RF field is not present only the input capacitor 26 is connected to the rectifier 14. Any reverse leakage current will only drain the voltage stored on the input capacitor 26. The voltage on the output capacitors 28 is preserved and is further available to supply the processor 18 with power. Therefore, it is reasonable to keep the capacitance of the output capacitor 28 much larger than the capacitance of the input capacitor 26. This concept also applies to the current that is shunted to ground through the limiter 15, which is typically implemented as a so called shunt limiter.

When the external RF field is comparatively strong, the limiter 15 is enabled to shunt a substantive portion of the current directly to ground in order to keep the voltage at the output 22 at an acceptable value. When the external RF field goes away during modulation there may be a period of time where the limiter 15 is still shunting current to ground. This is due to the finite bandwidth of the limiter 15 even though there is no external RF field present to provide any current. During this limited period of time the limiter 15 would start to discharge the output capacitor 28. With the switch 24 between the output capacitor 28 and the limiter 15 the output capacitor 28 can be quickly isolated from the limiter 15. As a consequence it cannot become subject to discharge. This electric isolation significantly reduces a ripple or fluctuation on the output voltage $V_{sup}$ when comparatively strong RF fields are present. In effect a more stable voltage supply to the processor 18 can be provided.

In FIG. 3, the performance improvement of the switch in the voltage regulation circuit 16 is illustrated. The diagram 50 shows various signal waveforms in volts versus time. The dashed line 51 represents Vrec at the input 20 and the solid line 52 represents Vsup at the output 22 when the switch 24 is implemented as described above. In comparison the line with circles or the trace 53 represents Vrec when the switch 24 is not present and when the voltage regulation circuit 16 would be implemented by means of conventional components such as Dickson type charge pumps.

The trace 53 shows the drop of the voltage Vrec when there is no switch 24 present in the voltage regulation circuit 16. The other two traces 51, 52 show the performance of the voltage regulation circuit 16 when the switch 24 is provided. As shown in FIG. 3 the Vrec voltage is drained by the rectifier leakage current and thus shows the voltage dropping to nearly 0 V while the output voltage Vsup is held up by the output capacitor 28. The Vsup voltage at the output is only discharged by the current consumption of the processor 18. The improvement is immediately apparent and evident when comparing the trace 51 of Vrec and the trace 52 of Vsup with the switch implementation and without the switch in trace 53. In addition, the total amplitude of the modulations or ripples of Vrec 51 are smaller than those of Vrec 53, i.e. when the switch 24 is absent. The relative levels of Vrec 51 and Vsup 52 can be changed via the ratio of the output capacitor 28 and the input capacitor 26.

Figure 4:
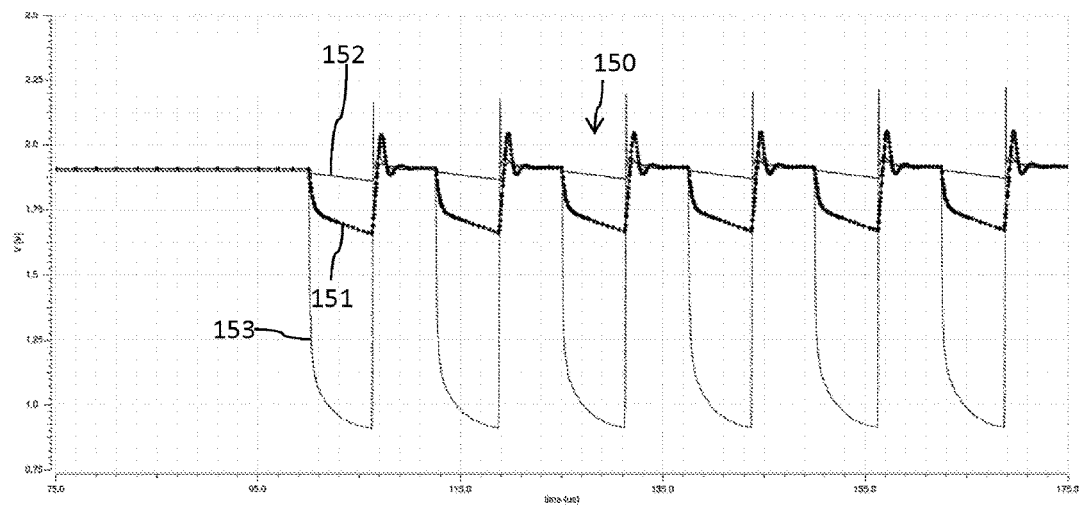
FIG. 4 is a further simulated output of the voltage regulation circuit when driven by a comparatively strong RF field.

In FIG. 4, another diagram 150 is illustrated when the voltage regulation circuit 16 is driven in a high power modulated RF field. Also here, the trace 151 represents Vrec, the trace 152 illustrates Vsup at the output 22 and the line with circles, hence the trace 153 illustrates Vrec if the switch 24 is not present. It is immediately apparent from the diagram 150 that the switch 24 reduces ripples or fluctuations of the DC output voltage. From a comparison of the traces 152 and 153 it is immediately clear that the switch 24 reduces any ripples or fluctuations on the output 22 from approximately 250 mV down to 50 mV. This reduction in the amplitude fluctuations of the output voltage Vsup may allow better performance for RFID circuits in general.

Figure 5:
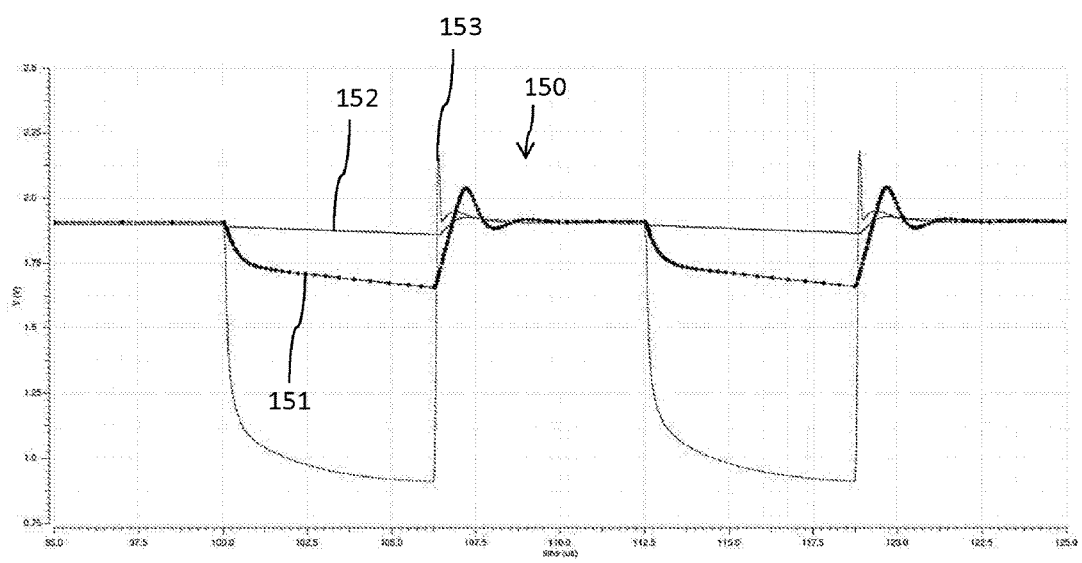
FIG. 5 is an enlarged sectional view of the diagram according to FIG. 4.

In the diagram according to FIG. 5, a situation is shown, wherein in the first 100 microseconds the RF field is in a CW condition and wherein the Vrec voltage is approximately 1.7 V. When after 100 µs the modulation starts, the Vrec voltage starts to drop. This drop is a result of the current consumption of the processor 18 and of the reverse leakage of the rectifier 15.

Especially RFID circuits that might be sensitive to supply voltage variations may provide a better performance. The reduced ripples or fluctuations of the output voltage of the voltage regulation circuit as described above could simplify the designs and/or reduce the current consumption of logic units or processors by relaxing power supply rejection criteria.

What is claimed is:

1. A voltage regulation circuit for an RFID circuit, the voltage regulation circuit comprising:
   an input connectable to a rectifier circuit,
   an output connectable to a processor of the RFID circuit,
   at least one switch arranged between the input and the output and connected to the input and the output, wherein the switch is capable to electrically connect the output to the input and to disconnect the output from the input, the at least one switch comprising
      a switch MOSFET transistor having a drain connected to the output and a source connected to the input, and
      a diode connected directly between the drain and the source of the MOSFET transistor.

2. The voltage regulation circuit according to claim 1, further comprising an input capacitor connected to the input.

3. The voltage regulation circuit according to claim 2, wherein a capacitance of an output capacitor connected to the output is at least 10 times, 100 times or 1000 times larger than the capacitance of the input capacitor.

4. The voltage regulation circuit according to claim 1, further comprising an output capacitor connected to the output.

5. The voltage regulation circuit according to claim 1, wherein an anode of the diode is connected to the source of the switch MOSFET transistor and wherein a cathode of the diode is connected to the drain of the switch MOSFET transistor and to a bulk of the switch MOSFET transistor.

6. The voltage regulation circuit according to claim 1, further comprising a current mirror having a first mirror MOSFET transistor and a second mirror MOSFET transistor, wherein a gate of the first mirror MOSFET transistor is connected to a gate of the second mirror MOSFET transistor.

7. The voltage regulation circuit according to claim 6, wherein a source of the first mirror MOSFET transistor is connected to the output and wherein a source of the second mirror MOSFET transistor is connected to the input.

8. The voltage regulation circuit according to claim 6, wherein a drain of the first mirror MOSFET transistor is connected to the gate of the switch MOSFET transistor.

9. The voltage regulation circuit according to claim 6, wherein a drain of the second mirror MOSFET transistor is connected to the gate of the second mirror MOSET transistor.

10. The voltage regulation circuit according to claim 6, further comprising a first biasing MOSFET transistor and a second biasing MOSFET transistor, wherein a gate of the first biasing MOSFET transistor is connected to the input and wherein a gate of the second biasing MOSFET transistor is connected to the output.

11. The voltage regulation circuit according to claim 10, wherein a drain of the first biasing MOSFET transistor is connected to a drain of the first mirror MOSFET transistor and a drain of the second biasing MOSFET transistor is connected to a drain of the second mirror MOSFET transistor.

12. An RFID circuit comprising an antenna, a rectifier circuit connected to the antenna, a processor and a voltage regulation circuit according to claim 1, wherein the input of the voltage regulation circuit is connected to an output of the rectifier circuit and wherein the output of the voltage regulation circuit is connected to an input of the processor.

13. A portable electronic device comprising at least one RFID circuit according to claim 12.

14. The voltage regulation circuit according to claim 1, further comprising a circuit connected in parallel with the drain and the source of the switch MOSFET transistor, the circuit including at least two transistors.

* * * * *

UNITED STATES PATENT AND TRADEMARK OFFICE
CERTIFICATE OF CORRECTION

| | | |
|---|---|---|
| PATENT NO. | : 10,043,124 B2 | Page 1 of 1 |
| APPLICATION NO. | : 15/380663 | |
| DATED | : August 7, 2018 | |
| INVENTOR(S) | : Kevin Scott Buescher | |

It is certified that error appears in the above-identified patent and that said Letters Patent is hereby corrected as shown below:

In the Drawings

In sheet 1 of 3, FIG. 1, reference numeral 14, Line 2, delete "Rectifer" and insert -- Rectifier --, therefor.

In the Specification

In Column 10, Line 18, delete "vsup" and insert -- Vsup --, therefor.

Signed and Sealed this
Twenty-first Day of April, 2020

Andrei Iancu
*Director of the United States Patent and Trademark Office*